No. 733,625. PATENTED JULY 14, 1903.
A. CLÉMENT.
CARBURETER FOR MOTOR BICYCLES.
APPLICATION FILED JUNE 4, 1902.
NO MODEL.
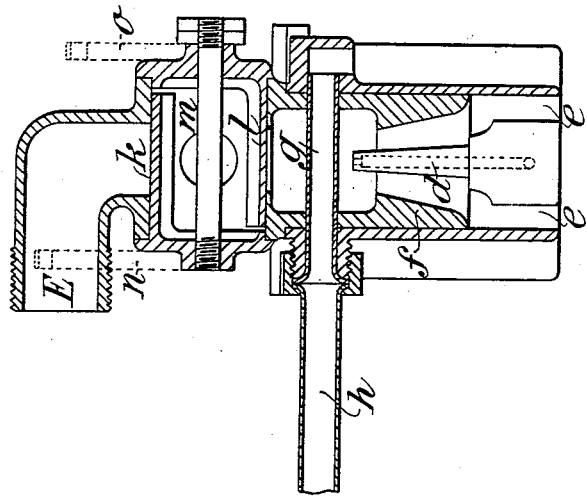
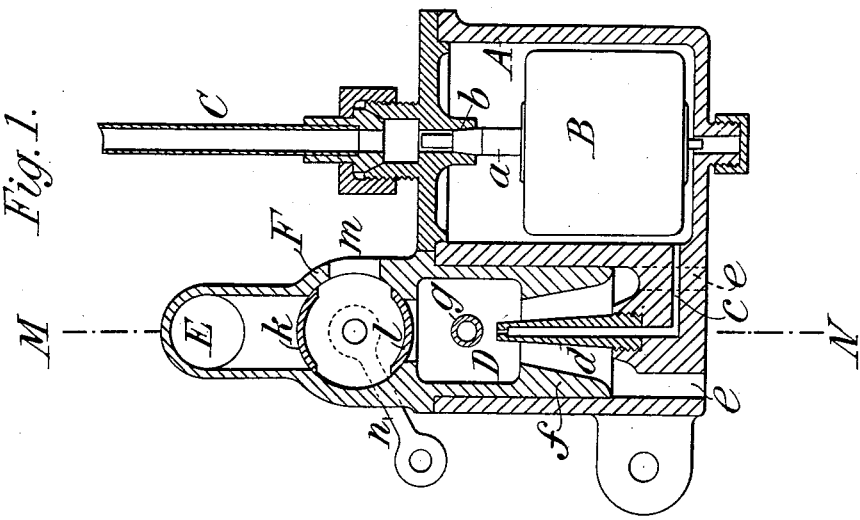
WITNESSES:
Fred White
Thomas T. Wallace
INVENTOR:
Adolphe Clément,
By his Attorneys:
Arthur E. O'Brien &Co.

No. 733,625. Patented July 14, 1903.

UNITED STATES PATENT OFFICE.

ADOLPHE CLÉMENT, OF LEVALLOIS-PERRET, FRANCE.

CARBURETER FOR MOTOR-BICYCLES.

SPECIFICATION forming part of Letters Patent No. 733,625, dated July 14, 1903.

Application filed June 4, 1902. Serial No. 110,164. (No model.)

*To all whom it may concern:*

Be it known that I, ADOLPHE CLÉMENT, a citizen of the Republic of France, residing in Levallois-Perret, Seine, France, have invented certain new and useful Improvements Relating to Carbureters Especially Applicable for Motor-Bicycles, of which the following is a specification.

This invention relates to carbureters more especially applicable for supplying the motors of motor-bicycles. The carbureter comprises two parts, one of them containing the float which carries the admission-valve and the second communicating with the first by means of the passage which terminates at the injector, through which the petrol enters. The liquid jet, which issues from the nozzle of the injector, impinges against a horizontal tube, which is arranged tranversely and through which the hot exhaust-gases pass. In this manner the somewhat intense cooling effects arising from the sudden expansion of the sprayed liquid, which cooling frequently gives rise to the formation of frost, owing to the congelation of the vapor, are obviated. The outer air, which is to mix with the petrol in a pulverulent condition, issuing from the injector, is admitted at the lower portion of the apparatus and enters through two large and almost semicircular apertures, so that a complete crown of air rises in the carbureter, surrounding the injector. The carbureter is also provided with a special cock, permitting the quantity of motor fluid sucked in and also the quality of this mixture to be readily and certainly regulated by the supplementary introduction of a larger or smaller quantity of air.

My improved carbureter is illustrated in the accompanying drawings, in which—
Figure 1 is a longitudinal section through the same, and Fig. 2 is a cross-section on the line M N of Fig. 1.

The carbureter consists of a body A, containing a float B, which carries the valve $a$, serving to obturate the admission-aperture $b$ for the petrol, which is conducted from an upper reservoir through the pipe C. From the part A a conduit $c$ terminates at the injector in the second part D. At the lower portion of this part D are formed two almost semicircular apertures $e\ e$, through which enters the external air, which completely surrounds the injector $d$, the conical constriction $f$ within the part D serving to force the air which is sucked in to pass over the periphery of the injector and to become thoroughly mixed with the very fine jet of pulverulent petrol, which issues from the nozzle at a high velocity through the small orifice indicated. Above the injector and transversely to it is arranged a tube $g$, against which the jet of liquid breaks, thus efficiently dividing it. This sudden expansion of the liquid sometimes produces a sufficient cooling to form a frost within the apparatus. I propose to avoid this disadvantage by causing to pass through the tube $g$ the hot exhaust-gases, which enter through the pipe $h$. The liquid jet then strikes against a heated tube instead of a cold one, and not only is the inconvenience above referred to obviated, but the oil is pulverized by the shock and vaporized by the heat. This double action expands the hydrocarbon throughout the surrounding column of air in an atomized and vaporized form and mixes the oil with the air intimately.

The explosive mixture is sucked through the pipe E of the motor. It passes through a cock, in the socket F of which are arranged two segments, which constitute the plug. Of these the segment $k$ permits of opening to a greater or less extent the orifice communicating with the pipe E, while the segment $l$ opens more or less the lateral orifice $m$, which permits of the admission of a supplementary supply of air. These two segments are operated by means of external arms $n\ o$.

I claim—

In a carbureter for hydrocarbon-engines, the combination of an upwardly-extending nozzle for oil having a small orifice for projecting a fine jet of oil at a high velocity, a conical air-conduit surrounding said nozzle to produce a concentrated cylindrical column of air around the jet, a transverse tube immediately in the path of the jet from said nozzle and adapted to carry the hot exhaust-gases from the engine, whereby the oil is simultaneously atomized by the shock and vaporized by the heat, and thus doubly expanded in the atomized and vaporized form throughout the surrounding column of air.

In witness whereof I have hereunto signed my name in the presence of two subscribing witnesses.

ADOLPHE CLÉMENT.

Witnesses:
JULES ARMENGAUD, Jeune,
PAUL F. PÁQUET.